June 18, 1968

F. GARTNER 3,388,784

LUMBER RECEIVING APPARATUS

Filed Aug. 30, 1966

INVENTOR
Frank Gartner

BY *Pennie, Edmonds,
Morton, Taylor & Adams*
ATTORNEYS

June 18, 1968  F. GARTNER  3,388,784
LUMBER RECEIVING APPARATUS
Filed Aug. 30, 1966  2 Sheets-Sheet 2
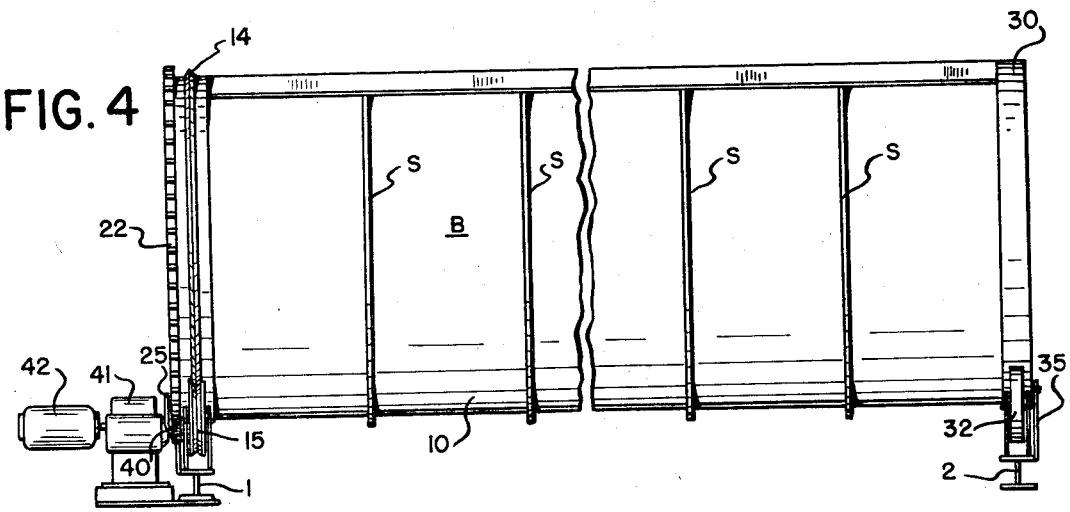
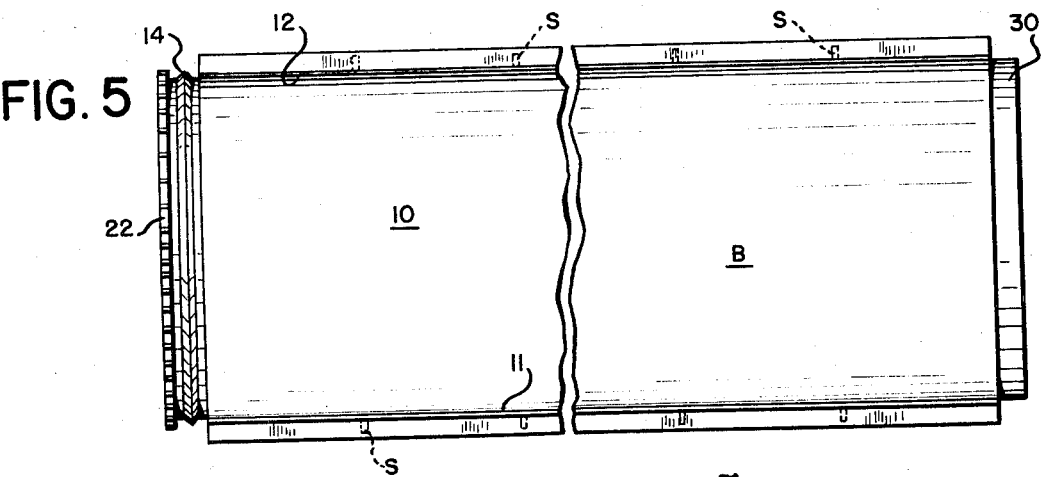
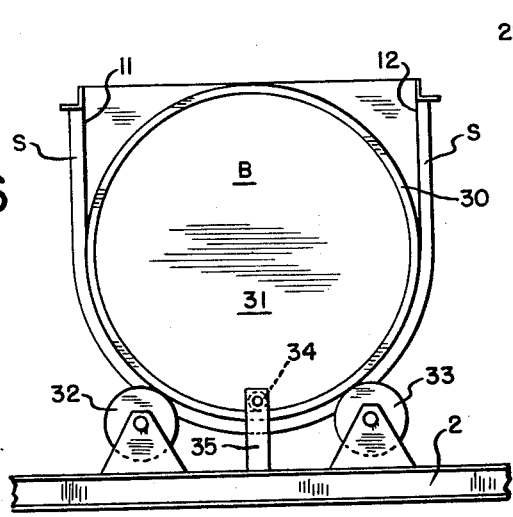
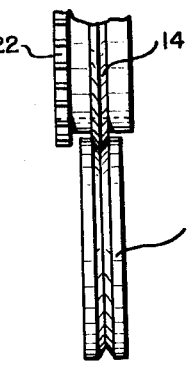
INVENTOR
Frank Gartner
ATTORNEYS

United States Patent Office 3,388,784
Patented June 18, 1968

3,388,784
LUMBER RECEIVING APPARATUS
Frank Gartner, North Vancouver, British Columbia, Canada, assignor to Rayonier Incorporated, New York, N.Y., a corporation of Delaware
Filed Aug. 30, 1966, Ser. No. 576,100
9 Claims. (Cl. 198—35)

ABSTRACT OF THE DISCLOSURE

A system is disclosed for receiving boards and planks of sawn lumber of various sizes, sorting and accumulating in individual accumulator bins boards and planks of the same size, aligning in neat compact loads the boards and planks of the same size accumulated in each bin, and periodically dumping the compact loads of boards and planks of the same size for delivery to ultimate users. A feature of the system is the individual accumulator bins of a size suitable for receiving boards of sawn lumber of a specified size, each bin being rotatably mounted for rotation about its generally horizontally disposed longitudinal axis and having an open top and a curved bottom wall. Power-driven means are provided to oscillate the accumulator bin through an arc of about 10° to 50° to arrange the boards and planks dropped into the bin into compact parallel-ordered loads, and power-driven means are provided to rotate the accumulator bin through an arc of at least about 180° to dump the accumulated load as a compact parallel-ordered mass.

---

The accumulaor bin makes it possible to accumulate lumber into compact, longitudinally ordered and quantitatively controlled units or loads and then unload them onto a properly positioned conveyor or other type conveyance in a matter of seconds without the need for anyone to touch a single piece of lumber. Moreover, by proper programming and arrangement a single operator can easily and effectively run a relatively large number of the bins in a series, say as many as 25 to 50 if desired, without assistance. This, of course, eliminates the need for a number of men and coupled with a minimum requirement for space and substantial freedom from maintenance problems makes the accumulator bins particularly attractive for use in mechanized sorting systems and especially in the so-called "drop-out" types.

In a preferred embodiment of the invention the accumulator bin has an open top to receive the lumber and a curved, preferably semicylindrical, bottom, and is mounted to oscillate or rotate on a longitudinal, preferably a horizontal, axis. Longitudinal sides extend upwardly from the curved bottom which sides may be parallel or curved slightly inwardly. The bin is provided with power means for periodically oscillating or rocking it through a small arc sufficient to straighten or align the lumber, and means to turn the bin over either automatically or by manual controls to unload the unit of lumber. A series of such bins may be used in combination with any suitable means of feeding the lumber to the bins as by hand or mechanically by a conveyor. For example, a drop-out conveyor system of known construction having pendant brackets into which the pieces of lumber are inserted and means to release the boards may be used. An operator stationed at the head end of the conveyor can operate an automatic memory system to cause removal means at each bin to release the boards having particular dimensions or quality from which they are dropped into a particular bin. For example, the operator who classifies a certain board on a hanger may operate a switch which sets an actuating means on the hanger of that board which causes the board to be released when it arrives at a particular bin. As a further example of automatic selecting means, an arrangement of photoelectric cells can be provided at the bins to cause the board having a certain length and width and/or grade to be released at the bin receiving such boards.

The accumulator bins may advantageously be arranged side-by-side and mounted, for example on a horizontal base, over a conveyor which can travel continuously or intermittently, and when a bin is loaded it is turned over and the load is dumped onto the conveyor which carries it to its intended destination.

In the accompanying drawings:

FIG. 4 is an enlarged side elevation of one of the accumulator bins shown in FIG. 1;

FIG. 5 is a plan view of the accumulator bin of FIG. 4;

FIG. 6 is a rear end view of the accumulator bin of FIG. 5, and

FIG. 7 is an enlarged fragmentary view showing the annular support rail.

Figure 1:
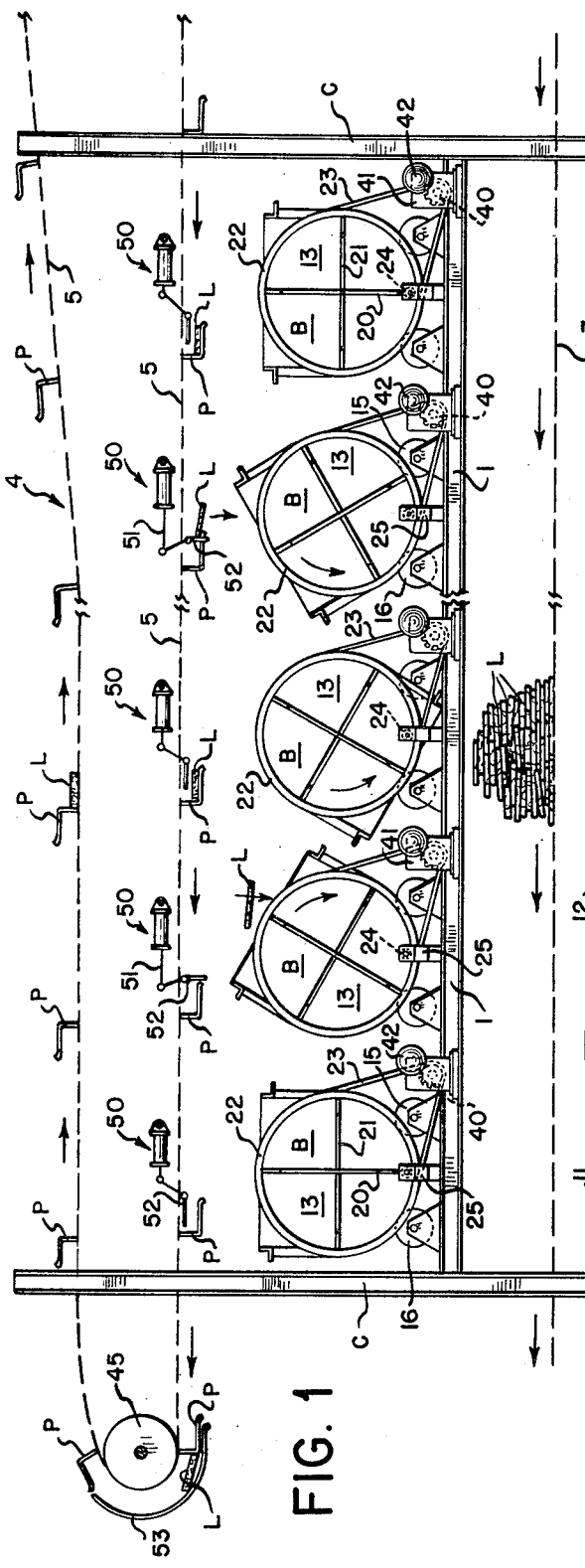
FIG. 1 is an end elevation of a combination of apparatus embodying the invention a part of which is shown in FIG. 3.

The embodiment of apparatus illustrated in FIG. 1 comprises a base consisting of two I-beams 1 and 2 on which are mounted a plurality of accumulator bins B, only five being shown but in actual operation there may be a much larger number, say thirty or forty. The I-beams are supported on steel columns C, a suitable distance above the conveyor 3. As a means for depositing selected pieces of lumber in particular bins a so-called drop-out conveyor system 4 is mounted above the accumulator bins and travels in the direction indicated by the arrows. This conveyor system has a multiplicity of pendant brackets P secured to the conveyor chain 5, into which pieces of lumber L are inserted at the station 6 (FIG. 3) where boards of random sizes and grades are received by conveyor 7.

The accumulator bins B may be of identical construction although they may vary in size if desired. The base I-beams 1 and 2 are shown in a horizontal position, although they may be sloped, and the bins are mounted to be turned on a longitudinal horizontal axis.

Each bin comprises a semicylindrical bottom 10 and integral tangential upright sides 11 and 12 which are reinforced with spaced stiffening bars S. The sides 11 and 12 shown upright and parallel may be curved inwardly a slight amount which permits the rotation of adjacent bins in closer quarters. As best shown in FIG. 5, the entire top portions of the bins are open for receiving the lumber.

Figure 2:
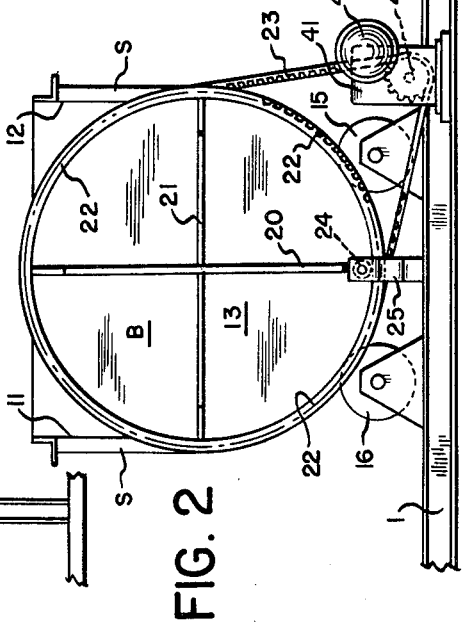
FIG. 2 is an enlarged front end view of one of the accumulator bins shown in FIG. 1.

The front end of each bin as shown in FIGS. 1 and 2 has an end closure 13 such as a flat steel plate welded to the bottom and sides and to this plate a V-shaped annular rail 14 (FIGS. 4, 5 and 7) is secured as by welding which runs on the V-grooved wheels 15 and 16 to support the front end of the bin and prevent lateral shifting. The flat plate end closure 13 has crossed stiffener bars 20 and 21 and an annular sprocket 22 attached to the end plate as by welding. The periphery has sprocket teeth for operation by the sprocket belt 23. The inner flat annular surface of the sprocket 22 is engaged by a hold-down roller 24 which is secured to the bracket 25. This roller holds the front end of the bin in position on the wheels 15 and 16 during its turning operation.

The opposite or rear end of each bin as shown in FIG. 6 has an annular flat track 30 secured as by welding to the end plate closure 31. The exterior surface of this track bears on the rollers 32 and 33 and the interior surface is engaged by the hold-down wheel 34 which is mounted on the bracket 35. This hold-down wheel assures that the rear end of the bin will remain in contact with the wheels 32 and 33 during the entire turning operation.

The sprocket belt 23 is driven by the sprocket 40 which is driven by the speed reduction gears of any suitable type in the gear box 41. A reversible motor 42 drives the speed reduction gears in either direction to rock the bin to an angular position of from 10° to 50° or to turn the bin over to dump the load, as shown in FIG. 1

This motor may be operated for intermittent oscillation to align the boards and when the operator either sees or receives a signal that the bin has received a full load the motor is set to turn the bin over and dump the load onto the conveyor 3 as shown in FIG. 1. When the bin is turned over the conveyor release means for that bin is locked out of action so that the board is not dropped but continues around the circuit as will be described presently.

Figure 3:
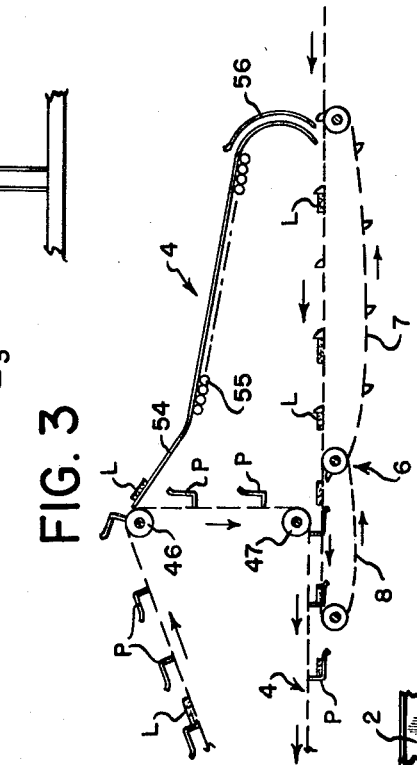
FIG. 3 is a continuation of the conveyor portion of FIG. 1.

The drop-out conveyor system 4 illustrated is well known and will be illustrated and described only generally. The chain conveyor 5 shown in FIGS. 1 and 3 is driven by power means (not shown) and travels over pulleys 45, 46 and 47. (Only one conveyor chain is shown but it is to be understood that a similar chain and pulleys are mounted rearward with reference to FIG. 1.) A multiplicity of pendant brackets or hangers P are secured to the chains to carry the boards one-at-a-time.

The conveyor 7 receives boards from a sawmill or similar supply and deposits them on the more rapidly traveling conveyor 8 which is traveling at a faster rate than conveyor 4. The boards deposited on conveyor 8 are accordingly pushed into the open ends of the pendant hangers P as shown in FIG. 3.

At a convenient position near the conveyor chain 5 and directly over each bin a board rake-off device 50 is mounted on structure (not shown). This device comprises an air-operated piston rod 51 which turns a bell-crank 52 which, when extended downwardly, engages the moving board and rakes it off the hanger P. In the event that a board intended for a particular bin arrives at the bin which is momentarily turned over, a means operated by the overturned bin blocks the action of the rake-off device and the board continues on over the pulley 45 and at a point on the curve falls out of the hanger P sliding downward over the curved guide plate 53 where it is picked up on the back of the next hanger P and is carried around the conveyor 4 to pulley 46 where the conveyor chain 5 descends vertically to pulley 47. The board is released and slides down the inclined chute 54 to the freely rotatable rollers 55 and continues through the guide channel 56 from which it is deposited on conveyor 7.

The freshly cut lumber from the usual sawmill produces a great variety of boards varying in length, width, thickness and grade and they leave the mill and arrive at a station from which they are fed by mechanical means, one-at-a-time onto the conveyor 7, then to conveyor 8 and to the hangers P. An operator may be stationed at a console near station 6 where he can see the type of board placed on a given hanger. He simply presses a button which is in electrical engagement with the air-operated rake-off device 50 and when the board arrives at the intended accumulator bin B the bell-crank 52 engages the board and rakes it out of the hanger at its open trailing end. The electrical and related means manipulated by the operator to carry out the functions described are known and in public use on "drop-out" sorter systems.

When the bin has received a full load, the operator sets a switch on the motor 42 to turn the bin over the dump the load onto the conveyor 3. This conveyor may operate continuously or intermittently to carry the load to any desired destination such as to an automatic reloading machine, where carrier load packages are made up or for further processing. The invention has been described by way of example as employing a drop-out type of conveyor. Other types of conveyors may be used in combination with the accumulator bins such as the "edge" sorters having conveyors in which the boards are clamped on edge and released automatically and allowed to drop to a receiving means. A "tray" sorter may also be used in which the lugs on a chain which carry the boards up a ramp are programmed electronically to deliver the boards to sorting means.

The accumulator bins of the invention are fast in operation and relatively trouble-free and are adaptable to use with many conveyor systems. They save a considerable amount of space relative to other lumbr sorting apparatus, and greatly reduce the amount of labor.

I claim:

1. The combination for selecting boards having particular specifications which comprises a plurality of accumulation bins, a conveyor system mounted above the accumulator bins for carrying a succession of random size boards from a sawmill or the like, means associated with the conveyor system for removing the boards intended for a particular accumulator bin, each bin having an open top into which the boards are dropped and a curved bottom and being mounted for turning on a longitudinal axis, means to rock each bin to align the boards on the bottom and also to turn the bin over to empty the load of boards, and means beneath each bin to receive the load of boards.

2. The combination as defined in claim 1 in which the accumulator bins can turn through an angle of 10° to 50° from the horizontal during oscillation and can receive boards while in a tilted position.

3. The combination as defined in claim 1 in which each accumulator bin has an arcuate bottom and upright sides inclined inwardly, and is supported at each end on wheels and annular rails.

4. The combination as defined in claim 1 which comprises a base for supporting the bins at their ends providing a space between the ends for dropping the load of boards from each bin onto the receiving means.

5. The combination as defined in claim 1 which comprises a plurality of bins arranged side-by-side under the conveyor system, each bin being independently power-driven to oscillate and turn over independently of the other bins.

6. Apparatus for receiving a plurality of boards and planks of sawn lumber, for arranging said lumber into compact, parallel-ordered loads, and for discharging said compact loads of lumber which comprises:

an elongated accumulator bin of suitable size for receiving said boards and planks of sawn lumber, said bin having an open top and a curved bottom wall and being provided with an annular track at each end of the bin, roller means supporting said annular track to rotate the bin about its generally horizontally disposed longitudinally axis, power-driven means connected to the accumulator bin to oscillate the bin through an arc of about 10° to 50° around its longitudinal axis to arrange boards and planks dropped into the bin through the open top thereof into compact, parallel-ordered loads of lumber, and to rotate said bin through an arc of at least 180° around its longitudinal axis to dump the accumulated load of lumber therein through the inverted open top in the form of a compact parallel-ordered load of lumber.

7. The apparatus as defined in claim 6 in which a reversible dotor-driven means is provided for oscillating the bin through a small arc, said bin being constructed to receive boards through the open top during oscillation.

8. The apparatus as defined in claim 6 in which the accumulator bin has an arcuate bottom and upright sides extending to the open top.

9. The apparatus as defined in claim 6 in which a conveyor system is mounted over the accumulator bin from which boards are dropped into the bin, and in which a conveyor system is mounted below the bin onto which the compact load of lumber is dropped from the overturned bin.

References Cited
UNITED STATES PATENTS

| | | | |
|---|---|---|---|
| 2,002,323 | 5/1935 | Korz | 259—75 |
| 2,815,138 | 12/1957 | Noffsinger | 214—765 |
| 3,021,122 | 2/1962 | Maxon | 259—171 |

RICHARD E. AEGERTER, *Primary Examiner.*